T. CURTIS.
Car Wheel.
No. 44,078. Patented Sept. 6, 1864.
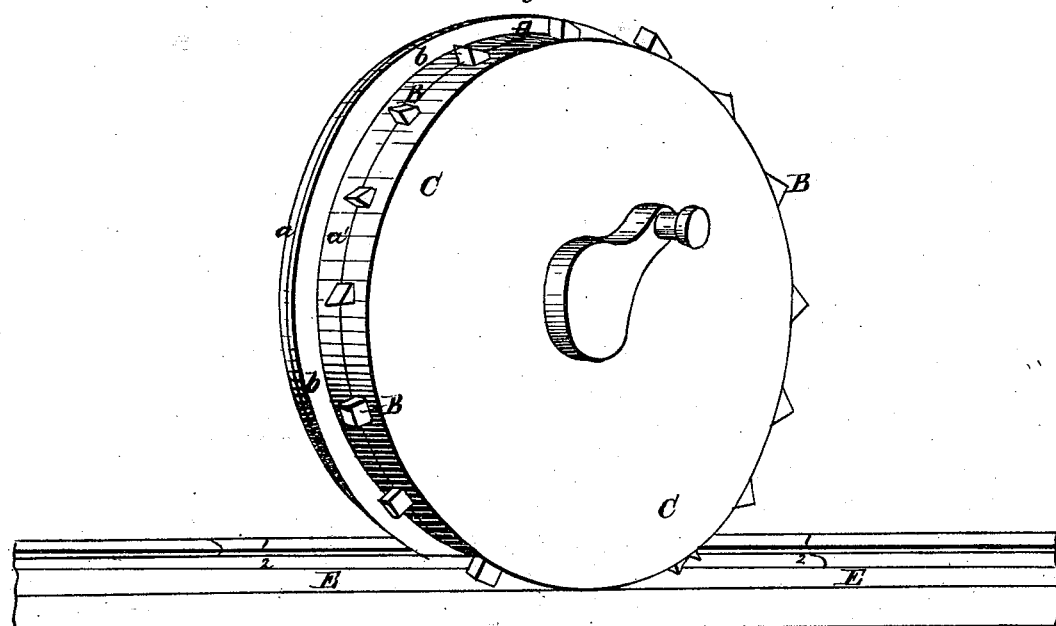
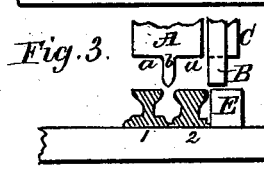
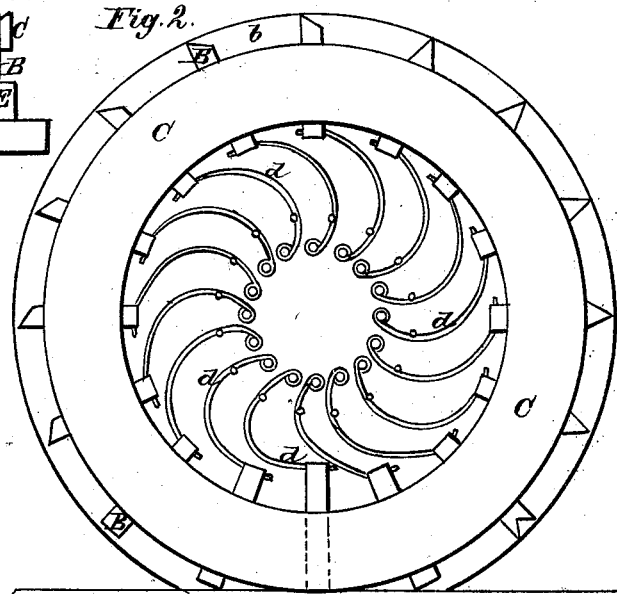
Witnesses:
Inventor:
Thomas Curtis

UNITED STATES PATENT OFFICE.

THOMAS CURTIS, OF NEW HUDSON, MICHIGAN.

IMPROVEMENT IN CAR-WHEELS FOR RAILROADS.

Specification forming part of Letters Patent No. 44,078, dated September 6, 1864.

*To all whom it may concern:*

Be it known that I, THOMAS CURTIS, of New Hudson, county of Oakland and State of Michigan, have invented a new and improved car-wheel to be used on railroads and tracks to be used in connection with such car-wheel; and I do hereby declare the following to be a full, clear, and exact description thereof, and of their construction and mode or manner of operation, reference being had to the accompanying drawings, and to the letters of reference marked thereon, and making a part of this specification.

The nature of my invention consists in the construction of a car-wheel, for use on railroads, which has a double rim or tread with a central projection or flange in the center between such treads, said wheel being also furnished or constructed with projecting yielding spurs on its periphery to assist in overcoming high grades and other resistance, and also preventing the slip of the driving-wheels, and in the formation and construction of a peculiar track to receive a wheel so constructed.

Figure 1 is a perspective view of my improved wheel and track. Fig. 2 is a side view of the wheel, showing the construction and operation of the projecting yielding spurs on its surface. Fig. 3 is a sectional view of the rails of one side track and of the wheel above it.

My improved wheel A has its rim or tread $a\ a'$ wider than that on wheels now in use and has a projecting flange, $b$, around the center of the rim, instead of such flange being on the side of the wheel, as on ordinary car-wheels. The whole rim or tread of the wheel is thus divided in the center and forms two treads on each wheel, each of which runs upon one of the rails forming the track, as will be hereinafter described, the flange passing between the separate rails forming such track, instead of being on the side of the track or rail, as now used. In other respects, except placing the flange in the center of the rim or face of the wheel, and thus making two treads, and in having the whole tread wider than heretofore made, the wheel is constructed in any of the usual forms.

In addition, I also arm the driving-wheels with a series of projecting and yielding spurs, B B, which may be placed around one or both edges of the rims $a\ a'$ of the wheel, and the object of which is, by their action on the surface or rail against which they act, to prevent the wheel sliding on the rails when going up steep grades or when running on a slippery track. These spurs B B may be notched at their ends, or have beveled or wedge-shaped surfaces, as shown in the drawings, and are made of bars of steel and are held in their places in boxes C C, which are fastened to the side of the wheel. Such spurs pass out beyond the rim of the wheel far enough to act upon or against the rail E as the wheels revolve. These spurs are operated by strong springs $d\ d\ d$, which force them against such rail and cause them to take hold of it one after another, but when they strike against any resisting surface, and as the wheel revolves, they push back the springs $d\ d$ and pass into the box, but are forced out again as soon as the resistance is removed. The wheel is thus armed with a continuous row of short elastic spurs extending around the rim of the wheel, the action of which is to catch and hold the wheel from slipping, but without impeding its motion.

The springs $d\ d$, which govern the operation of the spurs B B, are placed on the side of the wheel in the inclosing-box C, and act upon the inner end of such spurs and keep them forced out to their greatest length, such spurs being prevented from passing out of such box C by a shoulder, $f$, which strikes against the inside of the box. The drawings represent the use of a bent spring to operate each spur, but helical springs, india-rubber, and other springs may be made use of. The wheel A, thus armed with the spurs B B, is as completely prevented from sliding as if the wheel was surrounded with cogs gearing into like cogs upon the rail, but without any of the inconveniences attendant upon such gearing, as these spurs slide in and out and adapt themselves to any surface they strike. The track for my improved wheel is formed by the use of four rails, instead of two, and is so laid that two rails form such wheel-track, instead of such track consisting of but one rail, as usual. The two rails 1 2 in each track are laid just far enough apart to permit the flange $b$ on the wheels to run between such rails, and near enough so that the rim or tread of the wheel on each side of such flange $b$ will run and bear one tread on one rail and the other tread on the other rail. The rails forming such track are also so laid that they break joints, or so that the joints of the one set of rails are opposite to the middle parts of the rails of the other set, thus forming a continuous track for the wheels to run on, and thereby preventing the wheels from battering the ends of the rails where they come together, and giving a double track for each wheel, so constructed that as the wheel is passing over the joints of one set of the rails it is at the same time resting on the center of the other set.

By this arrangement and construction of tracks, the weight of the car or load is distributed upon four rails, instead of resting on two, and the weight upon each rail is thus correspondingly diminished. The rails are not, therefore, as liable to become battered, they will last longer, need not be as heavy, and the friction-surface is doubled. The flange of the wheel being between the two rails of each track, as the cars run to one side the flange on one wheel presses against the outside rail of one side track, while the flange of the other or opposite wheel presses against the inside rail of the other wheel-track; hence a rail on one wheel-track cannot be moved sidewise by the motion of the car without the corresponding rail on the other wheel-track also moving. There is, therefore, a double resistance and protection against any spreading of the track, as compared with the tracks as now laid.

For the use or operation of the spurs B B there is to be laid on the side of each wheel-track an additional rail, E, which may be of either wood or iron. If made of iron, these rails should have roughened surfaces, so that the spurs B B, as the wheels revolve, can take into such rails and hold the wheel from slipping. When made of wood, they will give a dent, so that the spurs will have sufficient hold, and when one side of any such rail is worn it may be turned and a fresh side placed uppermost. Such additional rail is to be so placed as to be directly under the spurs B B, and its face or upper surface is intended to be in or nearly in the same horizontal plane with the upper surfaces of the rails composing the track upon which the cars rest.

The spurs B B and their operating springs may be attached to the side of any ordinary driving-wheels now in use, and all their benefits made available, provided an additional rail is laid, as described, alongside of any existing track, and, as before described, such additional rail may be of either wood or iron.

What I claim as my invention, and desire to secure by Letters Patent, is—

1. The application to the wheels of railroad-cars of the movable spurs B B, operating substantially as and for the purposes set forth and described.

2. In combination with or for use in connection with wheels armed with such movable spurs, the use and application of the additional rail E for such spurs to act against, substantially as and for the purposes set forth.

THOMAS CURTIS.

Witnesses:
S. D. Law,
A. C. Farnham.